(12) United States Patent
Viegener et al.

(10) Patent No.: US 7,658,419 B2
(45) Date of Patent: Feb. 9, 2010

(54) FITTING AND METHOD FOR MANUFACTURING A FITTING

(75) Inventors: Walter Viegener, Attendorn (DE); Manfred Konig, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 0 days.

(21) Appl. No.: 12/146,781

(22) Filed: Jun. 26, 2008

(65) Prior Publication Data

US 2008/0272593 A1 Nov. 6, 2008

Related U.S. Application Data

(62) Division of application No. 11/392,124, filed on Mar. 29, 2006.

(30) Foreign Application Priority Data

Jan. 4, 2005 (DE) ....................... 10 2005 014 940

(51) Int. Cl.
*F16L 33/00* (2006.01)
(52) U.S. Cl. .................................... 285/256; 285/382.4
(58) Field of Classification Search ................. 285/256, 285/382.4, 382
See application file for complete search history.

(56) References Cited

U.S. PATENT DOCUMENTS

| | | | | |
|---|---|---|---|---|
| 602,617 A | * | 4/1898 | Dale ........................ | 285/256 |
| 2,028,316 A | * | 1/1936 | Brunner ........................ | 285/256 |
| 2,089,784 A | * | 8/1937 | Cornell, Jr. ............... | 285/148.9 |
| 2,250,286 A | * | 7/1941 | White .......................... | 285/256 |
| 2,292,421 A | * | 8/1942 | Wolf .......................... | 285/256 |
| 2,319,586 A | * | 5/1943 | Clench ........................ | 285/256 |
| 2,525,616 A | * | 10/1950 | Peeps .......................... | 285/247 |
| 4,513,489 A | * | 4/1985 | Sugiyama et al. ........... | 285/256 |
| 6,029,487 A | | 2/2000 | Genin et al. | |
| 6,805,385 B2 | * | 10/2004 | Viegener .................. | 285/382.2 |

FOREIGN PATENT DOCUMENTS

| | | |
|---|---|---|
| DE | 39 19 496 | 7/1990 |
| DE | 39 19 496 C1 | 7/1990 |
| DE | 43 36 201 | 4/1995 |
| DE | 43 36 261 A1 | 4/1995 |
| DE | 199 01 990 A1 | 8/2000 |
| DE | 100 29 479 | 2/2001 |
| DE | 199 54 456 A1 | 6/2001 |
| EP | 1 070 896 A2 | 1/2001 |
| EP | 1 281 456 A2 | 2/2003 |

* cited by examiner

*Primary Examiner*—David E Bochna
(74) *Attorney, Agent, or Firm*—Barnes & Thornburg LLP

(57) ABSTRACT

A fitting for connecting pipes together. The fitting includes a press-fit connection including a ring-shaped seat configured to receive at least one of sealing and holding elements. The fitting is configured to be sealingly connected to an inserted pipe end. A threaded connection is configured to be connected to a pipe by a thread on the threaded connection. The fitting is a single piece and is devoid of weldments.

8 Claims, 2 Drawing Sheets

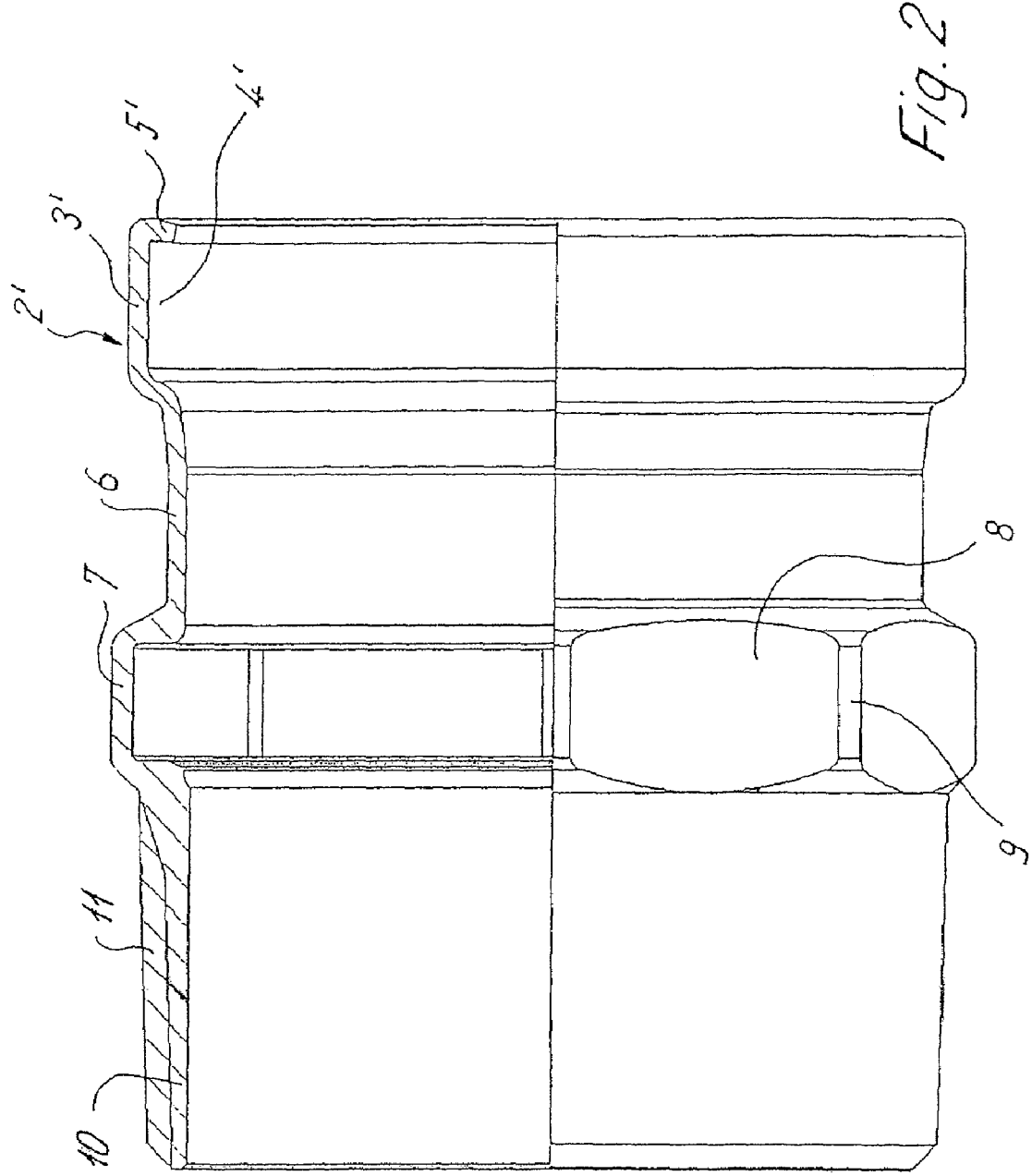

FITTING AND METHOD FOR MANUFACTURING A FITTING

CROSS-REFERENCE TO RELATED APPLICATION

This is a divisional Application claiming benefit to Non-Provisional patent application Ser. No. 11/392,124, filed on Mar. 29, 2006 the disclosure of the application is being incorporated by reference herein.

BACKGROUND AND SUMMARY

The present invention relates to a fitting for the connecting of pipes, comprising a press-fit connection provided with a ring-shaped seat for sealing and/or holding elements and which can be sealingly connected to an inserted pipe end by means of cold forming, and a threaded connection, which can be connected to a pipe by means of a threaded connection, as well as a method for manufacturing a fitting.

A method for manufacturing a metallic press-fitting element is known from DE 100 29 479 in which a solid or hollow bar is produced as the starting material for the press-fitting element that is machined. This way of manufacturing a press fitting is relatively costly, in particular the machining method produces waste products.

A method for the manufacture of press fittings is known from DE 43 36 261 in which a blank is initially deflected in a die and then the blank is upset to form circular grooves at various places. The wall sections are then rolled dimensionally accurate with a roller. This method can indeed be used to produce press fittings for a press-fit connection. Other connections, however, cannot be produced with this method.

A press-fittable fitting is known from DE 39 19 496 in which several connecting pieces are provided on one cast or pressed body. These connecting pieces are formed as press sections, which are connectable to a pipe end by means of pressing, wherein the connecting pieces are cemented or welded to the body. The mating of the connecting pieces to the body to create a fitting is relatively costly, however.

It is thus the object of the present invention to create a fitting and a method for manufacturing a fitting which facilitate the effective production of a fitting with different connection types.

This object is achieved by a fitting with the features as claimed in claim 1 as well as a method with the features as claimed in claim 5.

The fitting according to the invention comprises a press-fit connection, on which there is formed a ring-shaped seat for sealing and/or holding elements and which is connectable to an inserted pipe end by means of cold forming. It also comprises a threaded connection, which is connectable to a pipe by means of a threaded connection, wherein the fitting is produced in a single piece by means of forming. The need to combine different sections by means of joining, such as cementing or welding, is thus avoided. The different connection types formed by a threaded connection or a press-fit connection can be produced by means of a few steps of a method. Depending on the requirements, the walls are shaped and thickened by means of forming in order to obtain a corresponding fitting profile with only minimal use of material.

Preferably, a polygon is formed adjacent to the threaded connection, preferably in the shape of a hexagon. Thus the fitting can be fixed to the threaded connection during assembly by means of known tools. The thread can be created as internal thread or external thread.

The fitting is made preferably from a material with good cold forming properties, such as copper or steel. To ensure good ductility, copper with a fineness of over 99.8% can be used, such as CO-DHP.

According to the method according to the invention, a pipe section is pressurized and formed on one end to create a press-fit connection with a smooth-walled seat for inserting sealing and/or holding elements, and a middle section is formed to create a pipe-shaped polygon while thickening individual sections, wherein a thread is subsequently rolled down or cut into a second end of the pipe section to create a fitting with a press-fit connection and a threaded connection. In the section of the thread, the wall thickness can also be thickened previously by forming, depending on the material thickness of the starting material. Forming can thereby take place both at room temperature as well as in a heated state.

The hydroforming method is preferably used to form the pipe section, in which forming takes place under pressure with a fluid. This forming technique is gentle on the material and permits both contour changes as well as material thickening. Cold forging can also be used, depending on the geometry of the part.

Other aspects of the present disclosure will become apparent from the following descriptions when considered in conjunction with the accompanying drawings.

BRIEF DESCRIPTION OF THE DRAWINGS

FIG. 2 shows a second embodiment of a fitting.

DETAILED DESCRIPTION

Figure 1:
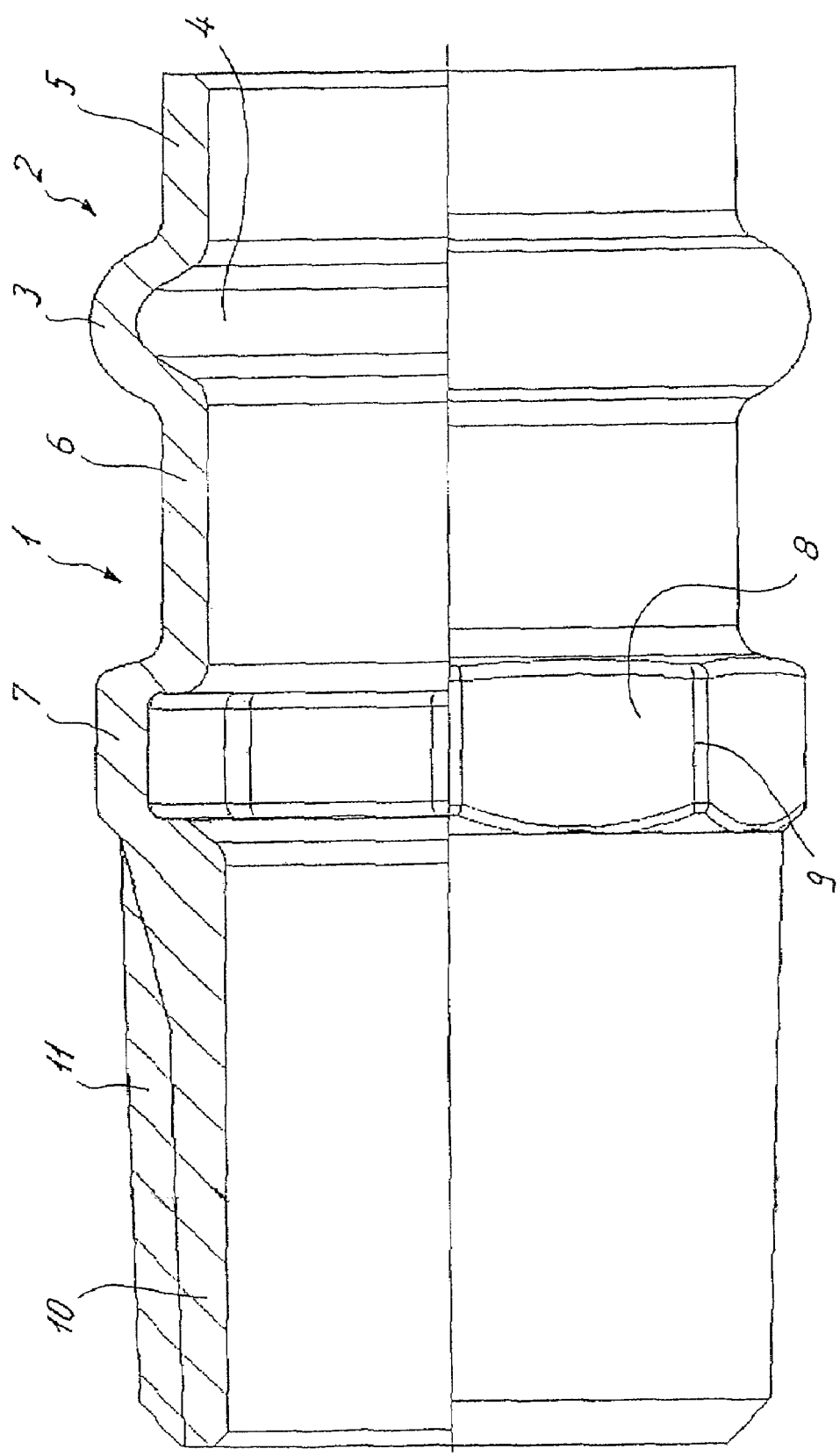
FIG. 1 shows a first embodiment of a fitting according to the invention.

A fitting 1 contains a press-fit connection 2, which contains a ring-shaped outward projecting bulb 3, by means of which an open seat 4 is created, in which a sealing ring can be inserted. A first cylindrical section 5 is created at the end of press-fit connection 2 and a second cylindrical section 6 is formed on the side of the bulb 3 facing the middle which can be formed by means of a pressing tool, in order to join an inserted pipe end permanently with the fitting 1.

The fitting 1 contains a threaded connection 10 on the side opposite the press-fit connection 2, which has a greater material thickness than press-fit connection 2. The threaded connection 10 has an external thread 11, adjacent to which there is a polygon 7. The polygon 7 takes the shape of a hexagon and contains on its outside circumference several surfaces 8 arranged in an angle which are spaced from each other by edges 9.

In the embodiment of a fitting shown in FIG. 2, a modified press-fit connection 2' is created, in other respects, however, the fitting is similar to the one shown in FIG. 1. The press-fit connection 2' contains a ring-shaped seat 3', which is U-shaped in cross-section and is terminated on the edge side by means of a web 5' that extends radially inward. The seat 4' is largely rectangular and is used to seat sealing and holding elements, like a cutting ring. In other respects, the press-fit connection 2' can, however, be formed radially inward from the outside by means of pressing tools, in order to provide a permanent connection with an inserted pipe end.

The method used to produce the fitting takes place by means of hydroforming. In this method, a pipe section is pressurized and formed. In the area of the press-fit connection 2 or 2' the corresponding geometry is produced, wherein the press-fit connection 2 and 2' is formed smooth-walled with a more or less uniform wall thickness. On the opposite side the material is thickened by means of upsetting for the threaded connection 10 and the polygon 7 and the polygon contour is created. After the blank is finished, the external thread 11 is rolled or cut in. The method used for production can also take place by means of cold forging.

In the illustrated embodiments, an external thread 11 is provided on each threaded connection 10. It is, of course, also possible to provide for internal threads.

The fitting 1 is made preferably of high-purity copper, wherein other metallic materials, such as copper alloys or steel can also be used which are correspondingly formable.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A fitting for connecting pipes together, the fitting comprising:
   a press-fit connection including a ring-shaped seat configured to receive at least one of sealing and holding elements and which is further configured to be sealingly connected to an inserted pipe end;
   a threaded connection which is configured to be connected to a pipe by a thread on the threaded connection;
   a middle section formed as a tubular polygonal-shaped element and located adjacent the threaded connection;
   the middle section includes a plurality of individual portions which are thickened relative to a remaining portion of the middle section, the remaining portion being located between the thickened plurality of individual portions; and
   wherein an adjacent section contiguous to one of the individual portions is the threaded connection.

2. The fitting as claimed in claim 1, wherein the fitting is made from a material selected from the group consisting of copper, copper alloys, and steel.

3. The fitting as claimed in claim 1, wherein the fitting is made from copper having a purity of over 99.8%.

4. The fitting as claimed in claim 1, wherein the polygonal-shaped element is shaped as a hexagon.

5. The fitting as claimed in claim 1, further comprising an additional adjacent section contiguous to one of the individual portions, such additional adjacent section being a cylindrical section.

6. The fitting as claimed in claim 5, wherein the fitting is made from a material selected from the group consisting of copper, copper alloys, and steel.

7. The fitting as claimed in claim 5, wherein the fitting is made from copper having a purity of over 99.8%.

8. The fitting as claimed in claim 1, wherein the fitting is formed as a single piece devoid of weldments.

* * * * *